June 26, 1962 J. M. STROUD ETAL 3,041,417

READOUT ON DEMAND TAPE STORAGE DEVICE

Filed May 26, 1959

INVENTORS
JOHN M. STROUD
JOHN C. WEBSTER
FRED A. STEINER
STANLEY H. SESSIONS

BY

ATTORNEYS 3,041,417

READOUT ON DEMAND TAPE STORAGE DEVICE

John M. Stroud and John C. Webster, San Diego, Fred A Steiner, El Cajon, and Stanley H. Sessions, Ridgecrest, Calif., assignors to the United States of America as represented by the Secretary of the Navy Filed May 26, 1959, Ser. No. 816,025
2 Claims. (Cl. 179—100.2)
(Granted under Title 35, U.S. Code (1952), sec. 266)

Figure 1:
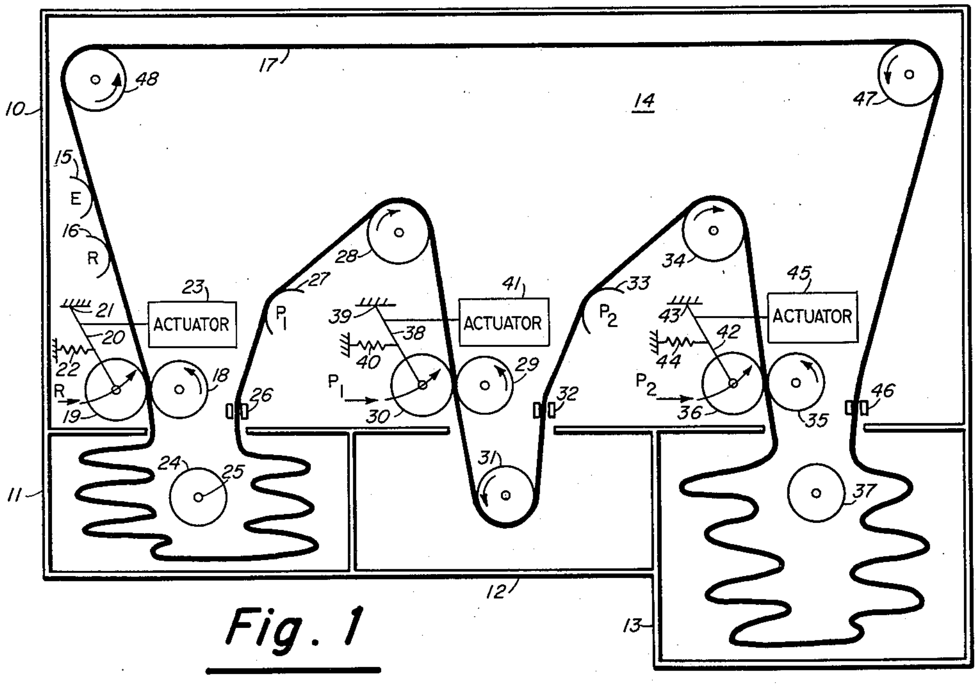

The invention described herein may be manufactured and used by or for the Government of the United States of America for governmental purposes without the payment of any royalties thereon or therefore.

This invention relates to message delay and storage devices in general and in particular pertains to a new and improved message storage apparatus of the sound reproduction character with instantaneous readout.

The storing of messages for readout at a subsequent time is not new. Representative devices which produce these effects are dictating machines and other recording apparatus using loops of magnetic tape which delay messages recorded thereon a given amount of time depending on the length of loop employed and its speed. Unfortunately, these types of recording apparatus have the limitation of an unvarying relatively long minimum time delay between recording and readout due to the necessity of manipulating the storage element between their respective components for performing these functions. In addition, these types of recording apparatus are not susceptible to being used for simultaneous recording and readout.

The subject invention constitutes a novel device which enables a recording to be made on a magnetic tape of the endless type or otherwise. This tape is then fed to a storage bin where it may remain indefinitely at the discretion of an operator. However, if at any time after the recording is made it is desired to readout, such can be effected merely by running the tape through the readout head assembly. It would appear to be noteworthy that the readout operation in no way effects the recording operation, in that readout may occur when the recording apparatus is inoperative, readout may occur while the recording operation is taken place, or readout of one recording may occur while another is being stored or in storage. Consequently, this invention is a versatile mechanism which enables information to be manually or automatically recorded, stored, or readout as desired under various and sundry operating conditions and requirements.

The primary object of this invention is to provide a new and improved information handling system.

Another object is to provide an improved sound reproduction apparatus.

It is a further object to provide a new and improved message storage device with substantially instantaneous readout.

It is a still further object of this invention to provide a new and novel device for simultaneously recording, storing, and reading out information.

It is also an object to provide an apparatus which carries out information recording, storing, and reading out operations by using a magnetic tape.

Last but not least, it is an object of this invention to provide an information handling system which is simple in construction and operation.

Figure 2:
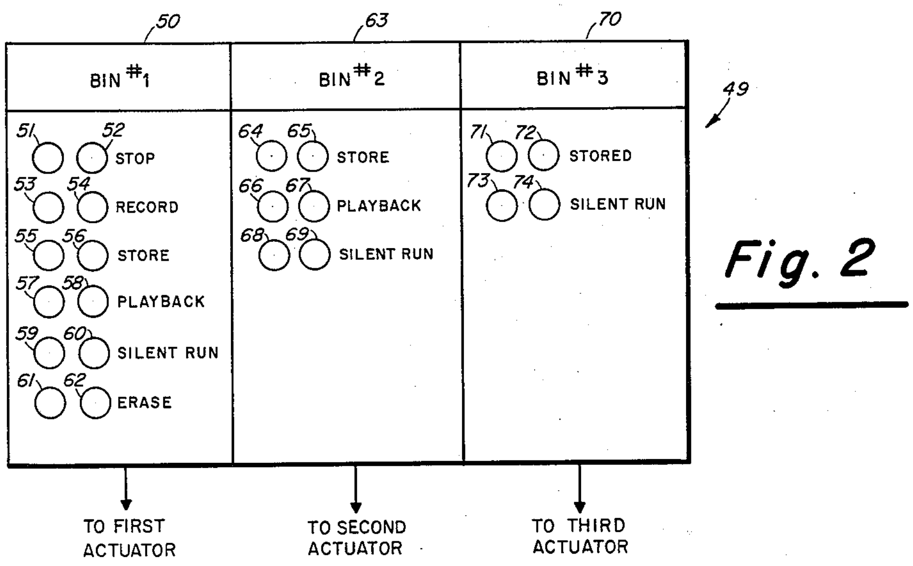

The functioning of the means for attainment of these and other more specific objects of the subject invention will be understood from the following description taken in conjunction with the accompanying drawings, of which:

FIG. 1 is a schematic diagram of the message recording, storing, and readout device in operative association; and FIG. 2 is a schematic diagram of an operator's console which may be used to control the device of FIG. 1.

Referring now to the drawings, wherein like reference characters designate like or corresponding parts throughout the several views, there is shown in FIG. 1 a container case 10 having a first storage bin 11, a second storage bin 12, a third storage bin 13, and a mechanism compartment 14. Disposed within said mechanism compartment is an eraser head 15, a recording head 16, and a recording tape 17 in electromagnetic association with and adapted to be driven passed said eraser head and said recording head by a first capstan 18 which, in turn, is powered by any conventional driving means such as a reversible motor or the like. Tape 17 is resiliently held against said first capstan by means of a first controllable pulley 19 that is rotatably mounted on a movable arm 20 pivoted at a point 21 on case 10 and biased by a spring means 22. A first console controlled actuator 23 containing pressure release switches is connected to said movable arm in such manner that said first idler pulley is moved manually or automatically toward or away from said tape to drive or release same, respectively, at the discretion of an operator who is operating from a console to be described later. Capstan 18 and idler pulley 19 are of such configurations as to guide tape 17 as well as drive it into said first storage bin where it may be stored indefinitely in a manner which will facilitate its removal therefrom. To accomplish this, a rotable idler pulley 24 mounted on a stationary shaft 25 is disposed in said first bin in such manner that said tape loosely extends around it during the storage thereof and rides thereon during the time the tape is progressing through the storage bin without being stored. Mechanical restraining of said tape is accomplished by a brake 26 resiliently urged against it at the pull-out location of said storage bin.

At the discretion of the operator, tape 17 may be drawn past a play-back head 27 and over a fixed shaft pulley 28 by a second powered capstan 29 and a second controllable pulley 30, during which time it is kept taut against said play-back head by said brake in order to be appropriately electromagnetically associated therewith.

The second storage bin is disposed in such manner as to act as a receptacle for the tape passing through the second capstan-idler pulley assembly in event that it is desired to be used for storage purposes. If, however, it is desired to play back the pre-recorded information without prior storage in the second bin, a third fixed shaft idler pulley 31 located therein enables the tape to be driven through a second brake 32, past a second playback head 33 and over a fourth fixed shaft idler pulley 34 by a third powered capstan 35 and its associated third controllable pulley 36.

Like said first and second storage bins, said third storage bin is associated with said third capstan-idler pulley assembly and a fifth fixed shaft idler pulley 37 to effect either storage or continuous movement of said tape as operationally desired.

The aforementioned second controllable pulley is also mounted for rotation on a movable arm 38 pivoted about a point 39 on container base 10 and biased by a spring 40 in such manner that said pulley may urge tape 10 in contact with capstan 29 when a second console controlled actuator 41 is actuated by the operator.

Likewise, said third controllable pulley is also mounted for rotation on a movable arm 42 pivoted about a point 43 on container base 10 and biased by a spring 44 in such manner that said pulley may urge tape 10 in contact with capstan 35 when a third console controlled actuator 45 is actuated by the operator.

If tape 17 is of the continuous loop type as shown in the preferred embodiment, it is maintained taut and disposed properly for electromagnetic association with the aforesaid eraser and recording heads by passing through brake mechanism 46 and over fixed shaft rotatable idler pulleys 47 and 48.

If it is desirable to store more than two messages, it is obvious that additional storage bins and associated play-back mechanisms could be employed in conjunction with the device disclosed herein.

Each of the foregoing storage and play-back assemblies is controlled by the operation from a console—such as that depicted in FIG. 2. If desired, any conventional automatic message reception apparatus may be used in conjunction with said console for the purpose of receiving and appropriately storing messages without the attention of an operator being required. Likewise, any conventional control system, remote or otherwise, may be employed between said console and the various actuators of the above mentioned record-storage-playback mechanisms, whereby messages are timely recorded, stored, or played back at the discretion of the operator and, at the same time, an indication may be presented with respect to which operation is occurring at any given time.

In further considering FIG. 2, a console 49 contains a bin #1 panelboard 50 with exemplary control buttons and indicator lights which are appropriately connected to actuator 23. A button 51 stops the operation of the tape mechanism in the bin #1 position and a light 52 indicates that said mechanism is stopped. A button 53 and associated indicator light 54 causes messages to be recorded and simultaneously indicating that recording is taking place. Buttons 55, 57, 59, and 61 and respectively associated indicator lights 56, 58, 60, and 62 may be used to cause the tape mechanism to also store messages, playback messages, run siliently, or erase, as the case may be.

A bin #2 panelboard 63 contains buttons 64, 66 and 68, lights 65, 67, and 69 which may be operated to cause the tape mechanism to be stored in said bin, played back, silently run and so indicated, respectively.

In addition, a bin #3 panelboard 70 has buttons 71 and 73, lights 73 and 74 which also may be operated to provide the desired tape performance with respect to said #3 bin.

All of the foregoing buttons, controls, lights, etc. are operatively connected to their respective actuator mechanisms to effect these results. Obviously, many ways of so doing would be recognized by the skilled artisan, and, hence, said connections per se do not constitute a part of this invention. Therefore, it should be understood that conventional telemetering between said console assembly and said tape mechanism may be employed to achieve the operational objectives desired.

The operation of the subject invention is quite simple but has been found to be very effective and valuable. As the endless electromagnetic tape moves past the recording head, incoming messages are recorded thereon. Movement of the tape is accomplished by actuating the first capstan idler pulley so that the tape is friction driven in its appropriate path toward the first storage bin. At the discretion of the operator, said taped message may be stored indefinitely in said bin or played back immediately by actuating the second capstan-idler pulley assembly so that the tape is withdrawn from said first bin and moved past the first play-back head.

If so desired, after playing back the first time, said message may again be stored in the second storage bin for a subsequent playback. But, at the same time, a new message may be recorded and stored in the first storage bin without disrupting or destroying or making it difficult to use the first recorded message. The convenience of this aspect of the operation of this invention provides the operator with considerable operational latitude during busy periods when a plurality of messages are received, one after the other, without time to play each back immediately after reception. Or, in event that it is necessary to hear some intermediate message, such would be possible without adversely affecting messages being received or prior stored messages. Hence, it can be seen that this invention facilitates obtaining the most information with optimum operational timing.

Although only three storage bins are illustrated by the preferred embodiment, any number of storage bins and associated play-back heads may be used without violating the inventive concept. In addition, obviously the recording tape could be run backwards if desired for purposes of repeating the playing back of messages, or if found to be advantageous to do so, said tape could be routed in such manner that more than one message can be stored in any one bin. Likewise, a plurality of the preferred embodiment units could be operated in concert if simultaneous reception and storage of a plurality of messages becomes advantageous.

It should, therefore, be obvious that many modifications and variations of the present invention are possible in the light of the above teachings. Thus, it is to be understood that within the scope of the appended claims the invention may be practiced otherwise than as specifically described.

What is claimed is:

1. A message storage system comprising in combination, an endless tape recording means adapted to traverse a predetermined path, a recording head electromagnetically associated with said endless tape recording means for recording message signals thereon, a plurality of capstan drive means disposed intermittently along said path adapted for frictional contact with said endless tape recording means for moving same, a like plurality of controllable idler pulleys respectively adapted for movement into engagement with said endless tape recording means on the side thereof opposite the position where same engages said plurality of capstan drive means, actuating means connected to each of said plurality of idler pulleys for timely moving same out of engagement with said endless tape recording means into sufficient friction contact with said capstan drive means for movement thereof along said predetermined path, a plurality of storage bins disposed between said plurality of capstan drive means in such manner that each one is in alternate succession with each of the others along said path, means disposed along the predetermined path of said tape at the exit of each of said plurality of storage bins for braking the movement of said tape as it is being withdrawn therefrom, playback head means for reading out said message signals positioned in electromagnetic relationship with said endless tape recording means and disposed between each of said capstan drive means, means disposed within said storage bins adapted for guiding said endless tape recording means therethrough, means contacting said endless tape recording means for guiding same along said predetermined path, and an eraser means electromagnetically associated with said endless tape recording means for timely deleting a portion of the message signals therefrom while the remainder of said message signals are being stored in the aforesaid bins.

2. A message storing apparatus comprising in combination, an endless magnetic recording tape disposed to traverse a predetermined endless path, a recording head juxtaposed with said tape for recording signals thereon, a first capstan adapted to frictionally drive said tape along a portion of said path, a first compartment disposed along said path for storing a first portion of said tape after said signals have been recorded thereon, a second capstan disposed for frictional drive contact with said tape for causing withdrawal thereof from said first storage compartment, a fixed shaft pulley disposed along the path of said tape for guiding same toward said second capstan, brake means frictionally associated with said tape at the exit position of said first compartment for providing tautness to said tape along the path thereof between said brake means, said fixed shaft pulley, and said second capstan when said second capstan is driving said tape, a first readout head contiguously disposed with said tape at a taut portion thereof located between said brake means and said fixed shaft pulley, a second compartment disposed down said path for receiving and storing a second portion of said tape after same has been driven thereto by said second capstan, means disposed within each of said first and second compartments for facilitating movement of said tape therethrough, a third capstan adapted for frictional engagement with said tape for driving a third portion thereof along said predetermined path, a second readout head contacting a portion of said tape disposed between said second compartment and said third capstan, a third compartment adapted to receive and store a portion of said tape after same has contacted said second readout head, means engaging said tape for guiding same along the aforesaid endless path, eraser means for removing said signals from said tape after said tape has been withdrawn from said third compartment as it traverses said predetermined path, and means associated with said first, second, and third capstans for timely holding said tape in frictional engagement therewith.

References Cited in the file of this patent

UNITED STATES PATENTS

| | | |
|---|---|---|
| 2,380,392 | Begun | July 31, 1945 |
| 2,499,700 | Tinkham | Mar. 7, 1950 |
| 2,519,725 | White | Aug. 22, 1950 |
| 2,535,498 | Kornei | Dec. 26, 1950 |
| 2,988,604 | Nye | June 13, 1961 |
| 2,989,594 | McKaig | June 20, 1961 |

FOREIGN PATENTS

| | | |
|---|---|---|
| 585,258 | Germany | Sept. 30, 1933 |
| 688,567 | Great Britain | Mar. 11, 1953 |